Figure 1:
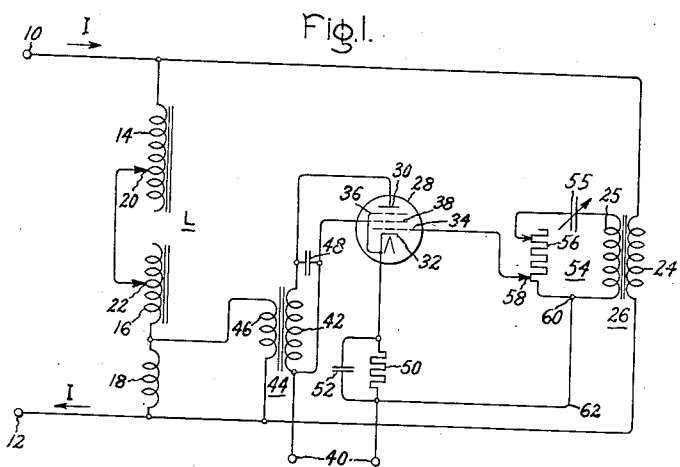

Oct. 21, 1941.                H. L. CLARK                2,260,002
                          IMPEDANCE DEVICE
                         Filed May 24, 1940

Inventor:
Howard L. Clark,
by Harry E. Dunham
His Attorney.

Patented Oct. 21, 1941

2,260,002

UNITED STATES PATENT OFFICE 2,260,002

IMPEDANCE DEVICE

Howard L. Clark, Ballston Lake, N. Y., assignor to General Electric Company, a corporation of New York Application May 24, 1940, Serial No. 336,984

4 Claims. (Cl. 178—44)

This invention relates to impedance devices and more particularly to impedance elements adapted to be connected in an alternating current network analyzer circuit.

The reactors customarily employed in connection with the operation of electrical power systems have an extremely low power factor or ratio of resistance to reactance. It is not at all unusual in connection with such systems, for example, to find inductive reactors employed in which the resistance component is as low as one percent of the reactance component. In making synchronous impedance studies or laboratory analyses of a power system to determine the behavior of the system under various assumed conditions of operation, it is customary to employ a miniature network or equivalent circuit using reactors, capacitors and the like. In order to obtain a reactor in which the resistance component is as low as one per cent of the reactance component, corresponding to the condition mentioned hereinbefore, it has been necessary to employ either a very large reactor or one in which the core on which the winding is wound is composed of expensive magnetic material. Also, to maintain this small ratio of resistance to reactance over a large range of reactance it has been customary to employ a reactor having a suitable grading of wire sizes, which has added to the cost of the apparatus.

It is an object of my invention to provide an improved impedance circuit arrangement whereby a small reactor having normally relatively poor reactor qualities may be employed and at the same time provide a reactor circuit having substantially zero power factor, that is, one in which the current lags the external voltage applied to the circuit by approximately 90 electrical degrees.

It is another object of my invention to provide an improved auxiliary arrangement for supplying the losses in a reactor substantially in proportion to the square of the voltage of the circuit in which the reactor is connected.

It is a further object of my invention to provide an improved impedance device, adapted to be connected in an alternating current network analyzer circuit, and in which the losses are supplied from a secondary circuit energized in accordance with the voltage applied to the impedance device in order that the power factor of said impedance device may be maintained within the desired limits, without readjustment, irrespective of variations in the voltage applied to the reactor.

It is another object of my invention to provide an impedance device having a small ratio of resistance to reactance over a large range of reactance.

In accordance with my invention in its preferred form, I interpose a secondary or auxiliary voltage in the circuit of the reactor element which is connected in a network, which voltage is substantially 90° out of phase with the voltage applied to the reactor from the network. This secondary voltage is derived from the same source which energizes the reactor so that its magnitude is at all times proportional to the voltage applied from the network. With this arrangement the losses supplied to the circuit including the reactor from the auxiliary voltage source will be proportional to the square of the voltage applied to the reactor from the network, with the result that the losses in the reactor are substantially compensated irrespective of voltage variations. In the preferred form, this auxiliary voltage is interposed in the circuit by means including an auxiliary impedance element, the voltage of which adds vectorily to that across the reactor so that their resultant is equal to the voltage impressed from the network. The auxiliary voltage is made adjustable to maintain a constant ratio of resistance to reactance over a large range of reactance. In a modification, the auxiliary voltage is applied in proper phase relation by means including a portion of the main reactor so that the reactor acts as an autotransformer inducing a voltage proportional to the auxiliary applied voltage.

The novel features that I consider characteristic of my invention are set forth with particularity in the appended claims. The invention itself, however, both as to its organization and its method of operation, together with additional objects and advantages thereof, will best be understood from the following description when read in connection with the accompanying drawing in which Fig. 1 is a schematic electrical circuit diagram of apparatus arranged in accordance with my invention; and Fig. 2 is a modification of the apparatus shown in Fig. 1.

Figure 2:
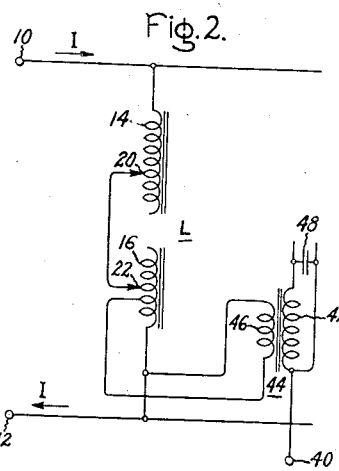

Referring now more in detail to the drawing, in Fig. 1 I have shown an electrical circuit having end terminals 10 and 12 adapted to be connected in an electrical circuit which, for the purpose of illustrating the principles of my invention, may be considered as an alternating current network analyzer circuit. Connected in series circuit relation across the terminals 10 and 12 is a reactor L having adjustable sections 14 and 16 and an auxiliary impedance element in the form of a reactor 18. The portion 14 of the main reactor L may compose, for example, 90 per cent of the total reactance while the portion 16 may compose the remaining 10 per cent. In order to adjust the magnitude of the reactance of the element 14 which is included in the circuit, I provide an adjustable tap or contact 20 and, similarly, to adjust the magnitude of the reactance of the reactor element 16, I provide an adjustable tap or contact 22. It will be seen that with such an arrangement if, for example, it is desired to provide a reactance of 54 per cent of the total, 50 per cent of this reactance may be obtained by adjusting the contact 20 and the remaining 4 per cent may be obtained by adjusting the contact 22.

The auxiliary impedance element 18 may be a reisstance element but I prefer to employ an inductive reactor as illustrated. The impedance of this element should be made small compared to that of the main reactor if it is desired not to change the impedance presented to terminals 10 and 12 from the value obtained without the power factor correction network.

As stated hereinbefore, to obtain a reactor element such as L in which the inductance and resistance are properly related, i. e. for which the power factor is substantially zero, without the employment of some auxiliary means, would require that the elements 14 and 16 be of very large construction or else it would be necessary to provide a core for the reactor elements which is composed of a very expensive magnetic material. To obviate these difficulties and to make it possible to employ an inexpensive reactor of relatively small size for obtaining an impedance device or an overall impedance characteristic across the terminals 10 and 12 in which the ratio of resistance to reactance is very small, I provide an arrangement for producing an auxiliary out-of-phase voltage in the circuit of the main reactor L. In accordance with the arrangement illustrated, I connect the primary winding 24 of a transformer 26 across the terminals 10 and 12 and in shunt with the main reactor L and the auxiliary impedance element or reactor 18. Consequently, the primary winding 24 is always energized with a voltage which is proportional to the voltage across the main reactor L which is applied from the terminals 10 and 12.

I provide apparatus including an amplifier and a phase shifting arrangement for producing dephased voltages across the impedance element 18, which voltage varies in magnitude in accordance with variations in the voltage across the terminals 10 and 12. The amplifier includes an electronic tube 28 having as essential elements thereof an anode 30, a cathode 32 and a control electrode 34. However, I prefer to employ a high amplification tube of the pentode type, in which case the electronic tube 28 includes in addition a suppressor grid 36 and the screen grid 38.

The anode-cathode circuit of the amplifier 28 includes the primary winding 42 of a transformer 44 and is energized from any suitable source of direct current 40. The secondary winding 46 of the transformer 44 is connected across the auxiliary impedance element 18. I preferably connect a capacitor element 48 in shunt with the primary winding 42 of the transformer 44 in order to improve the sensitivity of the apparatus and also to prevent undesirable oscillations in the circuit. A resistor element 50 and a by-pass capacitor 52 connected in both the output and input circuits of the amplifier 28 provide a suitable biasing means for the amplifier. The voltage induced in the secondary winding 25 of the transformer 26 is applied to a well known phase shifting network 54 comprising a variable capacitor 55 and a variable resistor 56. The control electrode 34 is connected to the resistor 56 through a slidable or adjustable tap 58 and the negative terminal of the source of supply 40 is connected to the juncture 60 of the resistor element 58 and the transformer winding 25 by means of a conductor 62. It will be appreciated that in the arrangement illustrated, the elements 55 and 56 will have such values as to give the desired out-of-phase relation between the current flowing in the secondary winding 46 and the current flowing in the reactor L, which displacement is preferably made substantially 90 degrees. In this way, the resultant current I flowing between the terminals 10 and 12 may be made to lag the voltage across these terminals by approximately 90°.

As will be understood by those skilled in the art, an increase in the voltage across the terminals 10 and 12, all other factors remaining the same, produces a corresponding increase in the flow of current through the reactor L. Consequently, the energy losses in the reactor L will vary approximately as the square of the voltage across the terminals 10 and 12. However, with the arrangement of my invention the auxiliary voltage or current applied to the auxiliary impedance element 18 varies in accordance with variations in the potential across the terminals 10 and 12, with the result that the losses in the reactor L are substantially compensated at all times to maintain the power factor within the desired limits without readjustment irrespective of variations in the voltage at the terminals 10 and 12 of the network circuit. Furthermore, a low ratio of resistance to reactance is obtained by the use of a more or less standard reactor with normally poor reactor or power factor characteristics.

The adjustable connection 58 makes it possible to maintain a small and substantially constant ratio of resistance to reactance over a large range of reactance. When the contacts 20 and 22 of the main reactor L are adjusted to a given setting, the contact 58 is adjusted to apply a voltage to the control electrode of the amplifier 28 of such a value that the amount of current flowing in the secondary winding 46 will be sufficient to produce the desired power factor of the reactor. When the contacts 20 and 22 are adjusted to give other values of reactance a different current will flow in the reactor. Consequently, the energy losses and the power factor will change. By means of the contact 58 the magnitude of the out-of-phase current flowing in the secondary winding 46 can be adjusted until the desired power factor of the reactor is obtained. Heretofore, this problem has been solved by employing a suitable grading of wire sizes corresponding to the different reactor taps, which has added further to the cost of the apparatus.

In operation, with the arrangement connected as indicated, the adjustable tap 58 is adjusted to give the desired voltage output across the transformer 46 and this voltage will have the desired phase relation by virtue of the phase shifter 54 connected in the input circuit of the amplifier 28. Consequently, the current I may be made to lag the voltage at the terminals 10 and 12 by substantially 90° and this condition will be maintained irrespective of variations in the magnitude of the voltage across the terminals 10 and 12. If it is desired to insert different values of reactance in the circuit, it is merely necessary to adjust the taps 20 and 22. If the reactor elements 14 and 16 are of the type in which the cross section of the conductor employed tapers from one end to the other to give the proper conductor resistance, no further adjustment of the circuit will be necessary. However, if a uniform size of conductor is used throughout these elements, a shift of the taps 20 and 22 will cause a different current to flow with a consequent change in the losses but these losses may be properly compensated to produce the desired power factor merely by changing the setting of the contact 58.

In Fig. 2, I have shown a modified arrangement in which the auxiliary voltage supplied by the secondary winding 46 of the transformer 44 is supplied to a portion of the reactor element 16 of the main reactor L. In this case, the reactor element 16 acts as an auto-transformer to interpose a voltage of the proper magnitude and phase to cause the current I to lag the voltage across the terminals 10 and 12 by approximately 90°. The operation will be obvious from the foregoing description of Figure 1.

I have thus provided an arrangement whereby an impedance device having substantially zero power factor is provided by the use of a comparatively inexpensive and relatively small reactor. The arrangement has the further advantage that the losses in the reactor are always automatically compensated irrespective of variations in the voltage at the terminals of the network in which the reactor is employed. With the apparatus of my invention, the current flowing between the terminals 10 and 12 may be made always to lag the voltage across these terminals by substantially 90° and the magnitude of the reactance may be made adjustable as desired. It will be appreciated that other impedance elements normally included in the network, such as resistors, capacitors and the like, may be adjusted to give the desired overall power factor of the circuit in order to assimulate various power system conditions.

While I have illustrated and described particular embodiments of my invention for the purpose of explaining the principle of operation, it will be obvious to those skilled in the art that modifications may be made without departing from the spirit of my invention and I therefore aim to cover all such modifications as fairly fall within the spirit and scope of my invention as set forth in the appended claims.

What I claim as new and desire to secure by Letters Patent of the United States is:

1. In a circuit having a pair of terminals adapted to be energized from a source of alternating voltage, an inductive impedance element having a substantial resistance component connected in circuit with said terminals for energization by said source, and means including a phase shifting device for interposing in the circuit of said impedance element and between said terminals an auxiliary alternating voltage having a phase displacement with respect to the voltage across said terminals and of such magnitude as to substantially neutralize the effect on the power factor of the loss component of the current in said impedance element.

2. In a circuit having a pair of terminals and adapted to be connected to an alternating current network, a reactor element connected to said terminals, an amplifier having input and output circuits, said output circuit being arranged to interpose an auxiliary voltage in the circuit of said reactor, means including a phase shifting device for energizing the input circuit of said amplifier with a voltage which is variable in accordance with variations in the voltage applied to said terminals, said auxiliary voltage being displaced in phase with respect to the voltage across said terminals and of sufficient magnitude to cause the current flowing between said terminals to lag the voltage therebetween by an angle of substantially ninety degrees.

3. In an electrical circuit having a pair of terminals adapted to be connected to an alternating current source of supply, a reactor and means including an auxiliary impedance element connected in series circuit relation, a phase shifting device energized from said source of supply for deriving dephased voltages, an amplifier having input and output circuits, means for energizing said auxiliary impedance element in accordance with the output current of said amplifier, and means connecting the input circuit of said amplifier to said dephased voltage, whereby a current is produced in said auxiliary impedance element of such phase and magnitude as to substantially neutralize the effect of the loss component of the current flowing in said reactor for causing the current flowing between said terminals to lag the voltage thereacross by substantially ninety degrees.

4. In combination, an impedance element for connection in an electrical network energized by a source of alternating voltage, said impedance element comprising two reactor sections, an amplifier having input and output circuits, means for energizing said input circuit with a voltage derived from said alternating voltage but displaced in phase therefrom, means connecting the output circuit of said amplifier to a portion of one of said reactor elements, whereby the energy losses in said impedance element are substantially compensated to produce substantially zero power factor between said source of alternating voltage and the current flowing between said terminals, means for varying the magnitude of the impedance of said impedance element, and adjustable means for varying the output current supplied to said reactor portion by said amplifier.

HOWARD L. CLARK.